(12) United States Patent  
Benischek et al.

(10) Patent No.: US 8,286,485 B2
(45) Date of Patent: Oct. 16, 2012

(54) GRAVIMETER LAUNCH MECHANISM

(75) Inventors: Vincent P. Benischek, Shrub Oak, NY (US); Peter F. Brand, Huntington Station, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1005 days.

(21) Appl. No.: 12/267,047

(22) Filed: Nov. 7, 2008

(65) Prior Publication Data

US 2010/0116049 A1    May 13, 2010

(51) Int. Cl.
*G01V 7/00* (2006.01)

(52) U.S. Cl. ..................................... 73/382 R

(58) Field of Classification Search ............. 73/382 G, 73/382 R; 33/366.25, 366.11, 366.13, 366.26
See application file for complete search history.

(56) References Cited

U.S. PATENT DOCUMENTS

| | | | | |
|---|---|---|---|---|
| 3,727,462 A * | 4/1973 | Stone et al. | ............... | 73/382 R |
| 4,016,674 A * | 4/1977 | Resnick et al. | ............... | 446/409 |
| 6,082,194 A * | 7/2000 | Gladwin | ............... | 73/382 G |
| 6,125,698 A * | 10/2000 | Schweitzer et al. | ......... | 73/382 G |
| 6,298,722 B1 * | 10/2001 | Faller et al. | ............... | 73/382 R |
| 6,417,597 B1 * | 7/2002 | Baker, Jr. | ............... | 310/300 |
| 6,615,660 B1 * | 9/2003 | Feinberg et al. | ............ | 73/382 R |
| 7,129,901 B2 * | 10/2006 | Tietjen | ......................... | 343/757 |
| 7,225,553 B1 * | 6/2007 | Howard | ..................... | 33/366.13 |
| 7,562,460 B2 * | 7/2009 | Van Kann et al. | ......... | 33/366.25 |
| 7,637,153 B2 * | 12/2009 | Van Kann et al. | ......... | 73/382 G |
| 7,954,375 B2 * | 6/2011 | Zaugg | ........................ | 73/382 G |
| 2005/0191938 A1 * | 9/2005 | Sheltman et al. | ............ | 446/429 |
| 2009/0219546 A1 * | 9/2009 | Benischek | .................... | 356/482 |

* cited by examiner

*Primary Examiner* — Peter Macchiarolo
*Assistant Examiner* — Samir M Shah
(74) *Attorney, Agent, or Firm* — Kaplan Breyer Schwarz & Ottesen, LLP

(57) ABSTRACT

A gravimeter that utilizes an electromagnetic launcher for enabling a free-fall of a test mass is disclosed. The electromagnetic launcher propels the test mass upward such that the test mass begins to free-fall once it has reached the apex of its flight. In addition, in some embodiments, the test mass comprises only non-ferromagnetic materials so that the free-fall of the test mass is unperturbed by magnetically induced influences.

20 Claims, 5 Drawing Sheets

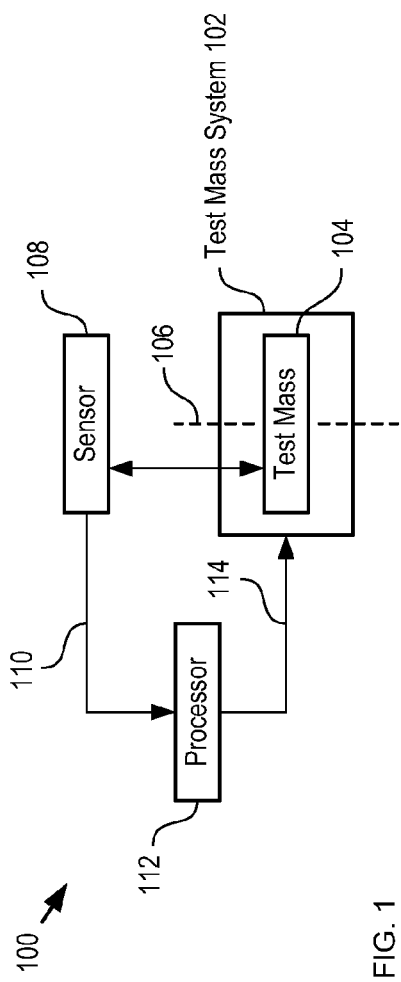
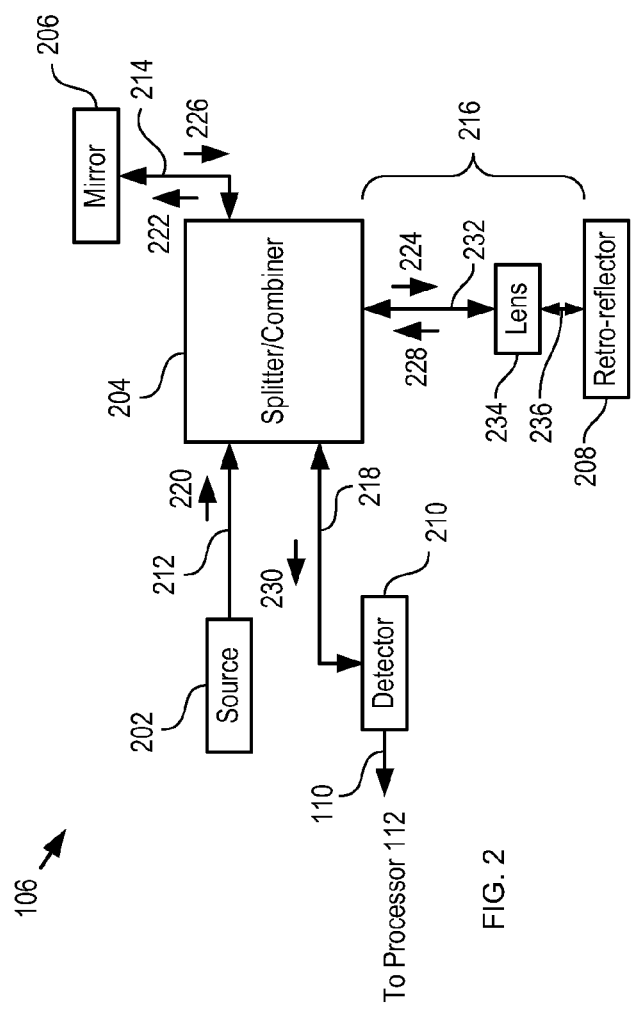
FIG. 1
FIG. 2

GRAVIMETER LAUNCH MECHANISM

FIELD OF THE INVENTION

The present invention relates to gravimeters.

BACKGROUND OF THE INVENTION

An individual gravimeter can be used to measure gravity in a local area. A pair of gravimeters can be used cooperatively to detect a differential gravity between two locations. Multiple differential gravimeters can be used to develop a three-dimensional map of gravity across a field or other region. Such 3-D mapping has been proposed in order to monitor fluid flow in-situ in subterranean reservoirs, such as oil fields.

A gravimeter must be extremely sensitive. For example, sensitivity below 1 micro-Galileo is necessary in many applications. Such extreme sensitivity, however, requires very high immunity to noise sources. Error can be introduced into the output signal of a gravimeter from noise sources such as electromagnetic interference, horizontal components in the acceleration of a free-falling mass, mechanical misalignment of sub-components, mechanical shock, and Coriolis forces that arise due to the rotation of the Earth.

Gravimeters have been developed that are based on the principle of balancing the weight of a fixed mass with forces from a normal or superconducting spring. Gravimeters such as these, however, can be difficult to setup and calibrate. In addition, such gravimeters can be sensitive to environmental influences such as temperature or vibration.

Gravimeters based on the measurement of the motion of a falling mass have also been developed. A sensor system is used to monitor the acceleration of the falling mass during its free-fall. In some instances, such a gravimeter utilizes a mechanical carriage to lift a test mass to a position from which it can subsequently free-fall downward. Typically, these gravimeters utilize a vacuum chamber to eliminate effects of air resistance on the acceleration of the test mass. There are several disadvantages associated with these gravimeter systems, however. The size and complexity of the mechanical carriage used to position the test mass typically limits the compactness of the system. In turn, the use of a mechanical carriage commonly requires that the vacuum chamber be quite large. As a result, the cost and expense associated with using such free-fall gravimeters precludes their use in many applications.

To overcome some of the drawbacks associated with the use of a mechanical carriage, gravimeters that utilize a piezoelectric launcher to vertically launch a test mass upward have been developed. The test mass is launched so that it begins a free-fall downward once it reaches the apex of its flight. In addition to some of the drawbacks of other prior-art gravimeters, however, the sensitivity of these gravimeters is limited due to shock and vibration associated with the piezoelectric launcher itself. This mechanical energy manifests itself as noise into the output signal, thereby reducing signal-to-noise ratio and sensitivity of the gravimeter.

There exists a need, therefore, for a gravimeter that avoids or mitigates some or all of the problems associated with prior-art gravimeters.

SUMMARY OF THE INVENTION

The present invention enables a high sensitivity measurement of gravity without some of the costs and disadvantages for doing so in the prior art. In particular, the illustrative embodiment of the present invention uses an electromagnetic launcher to propel a test mass upward along an axis to an apex. The launcher provides a force impulse that imparts sufficient momentum on the test mass so that it begins to free-fall downward along the axis once it has reached the apex. In some embodiments, the test mass is substantially ferromagnetic material free so that its free-fall is not substantially influenced by perturbations due to the Earth's magnetic fields, spurious electromagnetic energy, residual magnetic fields associated with the electromagnetic launcher, and the like.

In some embodiments, the test mass comprises an electrically conductive element that is supportive of the development of an eddy current in response to a current that flows in a nearby propulsion coil. In some embodiments, this electrically conductive element is a continuous loop of conductive material that surrounds the test mass. In some embodiments, this electrically conductive element is a cylinder of electrically conductive material that surrounds the body of the test mass. In some embodiments, this electrically conductive element is a circular disk of electrically conductive material that is attached to the test mass. In some embodiments, the body of the test mass itself is a cylindrical electrically conductive element.

In some embodiments, the test mass is propelled along the axis toward the apex by an armature that is accelerated by the flow of electric current in the propulsion coil. In some embodiments, the armature comprises ferromagnetic materials and the armature is propelled by a magnetic field that develops when the propulsion coil is energized. In some embodiments, the armature comprises an electrically conductive element that is supportive of the development of an eddy current in response to a current that flows in the propulsion coil. Inductive coupling between the electrically conductive element and the energized propulsion coil generates a force that propels the armature, and the test mass, along the axis.

An embodiment of the present invention comprises: a test mass, wherein the test mass is substantially ferromagnetic material-free; a housing, wherein the housing encloses the test mass in an environment that has a pressure of less than one atmosphere; a sensor, wherein the sensor provides a signal that is based on a free-fall of the test mass from an apex; and a launcher, wherein the launcher propels the test mass to the apex.

BRIEF DESCRIPTION OF THE DRAWINGS

FIG. 1 depicts a schematic diagram of details of a gravimeter in accordance with an illustrative embodiment of the present invention.

FIG. 2 depicts a schematic diagram of details of a sensor in accordance with the illustrative embodiment of the present invention.

FIG. 4B is described with continuing reference to FIGS. 1-3 and 4A.

DETAILED DESCRIPTION

Figure 3:
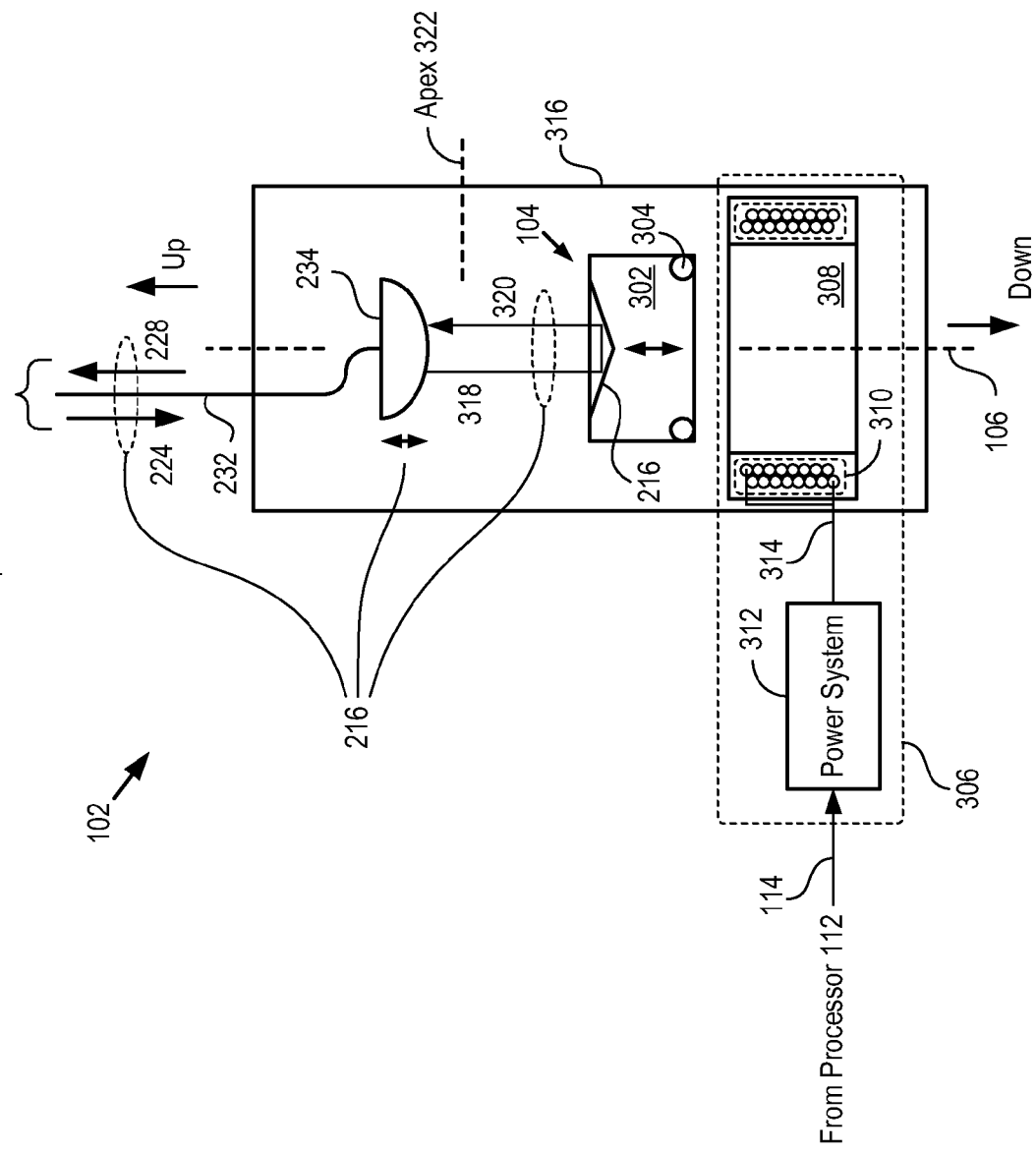
FIG. 3 depicts a schematic diagram of details of a test mass system in accordance with the illustrative embodiment of the present invention.

FIG. 1 depicts a schematic diagram of details of a gravimeter in accordance with an illustrative embodiment of the present invention. Gravimeter 100 is a system for sensing the gravity at the location of test mass 104. Gravimeter 100 comprises test mass system 102, sensor 108, and processor 112.

Test mass system 102 is a system for enabling the free-fall of test mass 104 along axis 106. Test mass system 102 is described in more detail below and with respect to FIG. 3.

Sensor 108 is a sensor for monitoring the motion of test mass 104 along axis 106. Sensor 108 provides signal 110 to processor 112.

Processor 112 is a conventional processing system for executing software instructions, storing data, and performing computation. Processor 112 computes a value for acceleration of test mass 104 as it free-falls along axis 106. Processor 112 computes this value based on signal 110. Processor 112 also provides control signals to test mass system 102 on control line 114. These control signals include, among other things, a signal for initiating a free-fall of test mass 104. It will be clear to one skilled in the art how to specify, make, and use processor 112.

FIG. 2 depicts a schematic diagram of details of a sensor in accordance with the illustrative embodiment of the present invention. Sensor 106 comprises source 202, splitter combiner 204, mirror 206, retro-reflector 208 and detector 210, optical fiber 232, and lens 234. Source 202, splitter/combiner 204, retro-reflector 210, mirror 206, and detector 208 collectively define a Michelson interferometer, wherein the instantaneous length of sense arm 216 is based on the instantaneous position of retro-reflector 208.

Source 202 is a source of coherent light. Source 202 emits light signal 220, which is conveyed to splitter/combiner 204 on source arm 212. It will be clear to one skilled in the art how to specify, make, and use source 202.

Splitter/combiner 204 is an optical element that receives light signal 220 and splits it into substantially equal light signals 222 and 224. Splitter combiner 204 also receives reference signal 226 and sample signal 228, which are reflected from mirror 206 and retro-reflector 208, respectively. Splitter combiner 204 combines reference signal 226 and sample signal 228 into output signal 230. Output signal 230 is conveyed to detector 210 on output arm 218. It will be clear to one skilled in the art how to specify, make, and use splitter/combiner 204.

Mirror 206 is a conventional mirror that is fixed in position such that the length of reference arm 214 is substantially fixed. It will be clear to one skilled in the art how to specify, make, and use mirror 206.

Retro-reflector 208 is a device that reflects light back toward its source without inducing substantial scattering of the light. As will be described below, and with respect to FIG. 3, retro-reflector 208 and test mass 104 are physically coupled so that the instantaneous position of retro-reflector 208 and therefore, the length of sample arm 216, is based on the instantaneous position of test mass 104 along axis 106. In the illustrative embodiment, retro-reflector 208 is a corner-cube mirror that is formed in a surface of test mass 104. In some embodiments, retro-reflector is a layer of material that is substantially reflective for light signal 220. In some embodiments, retro-reflector 208 is disposed in a recess formed in mass body 302. In some embodiments, retro-reflector 208 is formed by electro-plating, vapor deposition, evaporation, and the like. In some embodiments, retro-reflector 208 is an element that is encased in mass body 302. Suitable devices for use in retro-reflector 208 include, without limitation, first surface mirrors, corner-cube mirrors, corner-reflector mirrors, cat's eye reflectors, and the like. It will be clear to one skilled in the art, after reading this specification, how to specify, make, and use retro-reflector 208.

Lens 234 is a conventional plano-convex GRIN lens that substantially collimates light signal 318 as it emerges from optical fiber 232. Lens 234 also couples light signal 320 back into optical fiber 232. In some embodiments, lens 234 is a bulk optic element, such as a refractive lens or a diffractive lens. It will be clear to one skilled in the art how to make and use lens 234.

In operation, splitter/combiner 204 splits light signal 220 into light signals 222 and 224. Light signals 222 and 224 are substantially in-phase with one another. Light signal 222 is propagates to mirror 206, which reflects it back toward splitter combiner 204 as reference signal 226. In similar fashion light signal 224 is propagates to retro-reflector 208, which reflects it back toward splitter combiner 204 as sample signal 228. It will be clear to one skilled in the art, after reading this specification, that any or all of light signals 220, 222, 224, 226, 228, and 230 can be conveyed by any convenient means, such as optical fiber, surface waveguides, or, alternatively, propagate through free-space.

The phase of reference signal 226, as received by splitter/combiner 204, is based on the optical path length of reference arm 214, which is twice the distance between splitter/combiner 204 and mirror 206. Since the position of mirror 206 is substantially fixed, the length of reference arm 214 is substantially fixed. As a result, the phase of reference signal 226, as received by splitter/combiner 204, is also substantially fixed.

The phase of sample signal 228, as received by splitter/combiner 204, is based on the optical path length of sample arm 216. The optical path length of sample arm 216 is substantially equal to a combination of twice the length of optical fiber 232, twice the thickness of lens 234, and twice free-space distance 236. At lens 234, light signal 224 is launched into free-space and propagates to retro-reflector 208, for a distance equal to free-space distance 236. Retro-reflector 208 reflects the free-space light, which then propagates back to lens 234 (i.e., again, free-space distance 236). At lens 234, the free-space light is coupled back into optical fiber 232 as sample signal 228. The length of optical fiber 232 is fixed, as is the thickness of lens 234. Free-space distance 236, however, is dependent upon the position of test mass 104. As a result, the instantaneous phase of sample signal 228, as received by splitter/combiner 204, is based solely on the instantaneous position of test mass 104 along axis 106.

Upon receiving them, splitter/combiner 204 combines reference signal 226 and sample signal 228 into output signal 230. Reference signal 226 and sample signal 228 combine either constructively or destructively, as a function of their relative phases. The instantaneous amplitude of output signal 230, therefore, is based on the relative phases of reference signal 226 and sample signal 228 when they are combined at splitter/combiner 204. When test mass 104 is not moving, the relative phases of these two signals remains constant and, therefore, the amplitude of output signal 230 also remains constant. As retro-reflector 208 moves, however, the amplitude of output signal 230 varies based on that motion. Splitter/combiner 204 provides output signal 230 to detector 210.

Detector 210 is a device for converting light signal 230 into electrical signal 110. The magnitude of electrical signal 110 is based on the intensity of light signal 230. Detector 210 provides electrical signal 110 to processor 112. It will be clear to one skilled in the art how to specify, make, and use detector 210.

Although the illustrative embodiment comprises a sensor that is based on a Michelson interferometer arrangement, it will be clear to one skilled in the art, after reading this specification, how to specify, make, and use alternative embodiments of the present invention that sense the motion of test mass 104 using other technologies including, without limitation, wireless sensors, mechanical position sensors, piezoelectric sensors, optical position sensors, and capacitive position sensors.

FIG. 3 depicts a schematic diagram of details of a test mass system in accordance with the illustrative embodiment of the present invention. Test mass system 102 comprises test mass 104, launcher 306, and housing 316.

Housing 316 is an enclosure that encloses test mass 104, launcher 306, and lens 234 and protects them from their surrounding environment. Housing 316 is evacuated to mitigate the effect of air resistance on the acceleration of test mass 104 while it free-falls. Housing 316 is oriented such that test mass 104 is enabled to free-fall along axis 106. In some embodiments, housing 316 comprises a ballast that facilitates the alignment of axis 110 with the direction of local gravity. In some embodiments, housing 316 comprises a getter for improving the quality and longevity of a vacuum environment within housing 316.

At lens 234, light signal 224 is launched into free-space as light signal 318. As discussed above, and with respect to FIG. 2, light signal 318 propagates toward retro-reflector 216 for a distance equal to free-space distance 236, which is a function of the position of test mass 104. At retro-reflector 216, light signal 318 is reflected as light signal 320, which propagates back through free-space to lens 234 for a distance equal to free-space distance 236. At lens 234, light signal 320 is coupled back into optical fiber 232 as sample signal 228. The phase of light signal 318 at retro-reflector 216 is a function of the phase of light signal 224 at lens 234 and instantaneous distance between lens 234 and retro-reflector 216. In similar fashion, the phase of light signal 320 at lens 216 is a function of the phase of light signal 318 at retro-reflector 216 and the instantaneous distance between lens 234 and retro-reflector 216.

Launcher 306 is an electromagnetic propulsion system that comprises test mass 104, power system 312, and propulsion coil 310. Launcher 306 generates a propulsive force on test mass 104 when electric current flows in propulsion coil 310.

Power system 312 comprises circuitry that generates, conditions, and manages the delivery of electric current to propulsion coil 310 in response to a signal from processor 112. It will be clear to those skilled in the art, after reading this specification, how to specify, make, and use power system 312. In some embodiments, power system 312 is part of processor 112 rather than part of launcher 306.

Propulsion coil 310 is a coil of electrically conductive material suitable for carrying sufficient electric current to generate the magnitude of electromagnetic force required to propel test mass 104 to apex 322. Propulsion coil 310 is wound on coil body 308. Propulsion coil 310 and coil body 308 are substantially immovable with respect to housing 316. In some embodiments, propulsion coil 310 comprises a plurality of propulsion coils, wherein the flow of electric current in the plurality of propulsion coils can be sequenced by power system 312 to enhance the development of propulsive force on test mass 104. In some embodiments, housing 316 interposes propulsion coil 310 and mass coil 304.

Figure 4A:
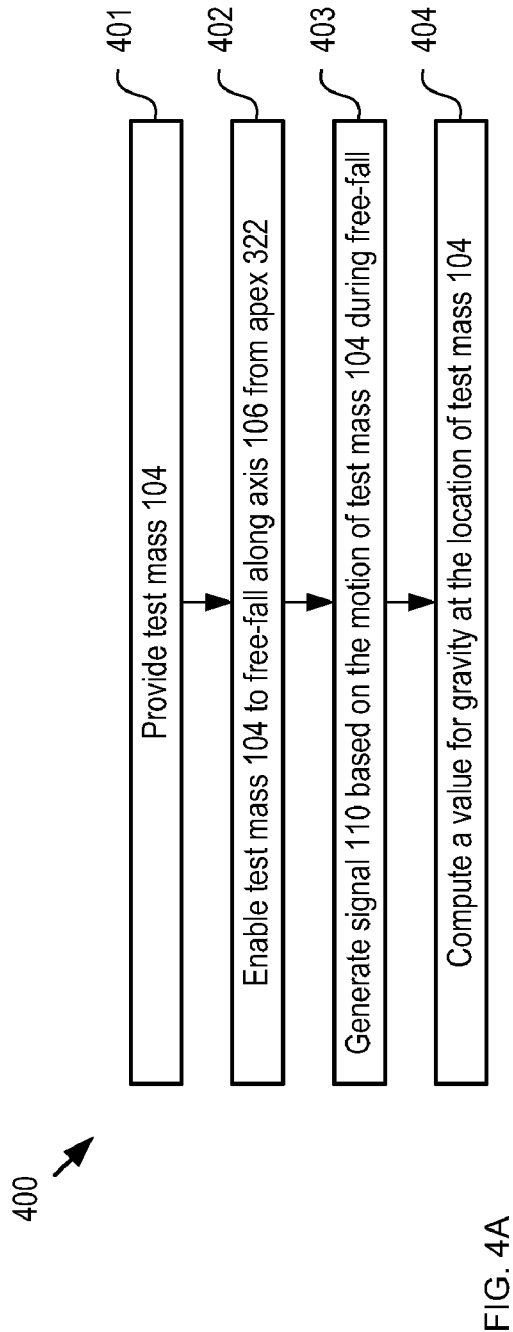
FIG. 4A depicts a method that comprises operations suitable for making a gravity measurement in accordance with the illustrative embodiment of the present invention.

FIG. 4A depicts a method that comprises operations suitable for making a gravity measurement in accordance with the illustrative embodiment of the present invention. FIG. 4A is described with continuing reference to FIGS. 1-3. Method 400 begins with operation 401, wherein test mass 104 is provided such that it is substantially ferromagnetic material-free. Test mass 104 comprises retroreflector 216, mass body 302, and mass coil 304.

Mass body 302 comprises a mechanically stable, non-ferromagnetic material. Materials suitable for inclusion in mass body 302 include, without limitation: non-ferromagnetic metals and alloys, such as aluminum, copper, etc.; ceramics; polymers; glasses; composites; and the like. In some embodiments, retro-reflector 208 is disposed in a recess formed in mass body 302. In some embodiments, retro-reflector 208 is formed by electro-plating, vapor deposition, evaporation, and the like. In some embodiments, retro-reflector 208 is an element that is encased in mass body 302.

Mass coil 304 is a ring of non-ferromagnetic, electrically conductive material suitable for supporting the formation of an eddy current in response to an electric current that flows in propulsion coil 310. In some embodiments, mass coil 304 is a cylinder disposed on the outer surface of mass body 302. In some embodiments, mass body 302 comprises a non-ferromagnetic, electrically conductive material and the need for a separate mass coil 304 is obviated.

It was recognized by the inventors that the exclusion of ferromagnetic material from test mass 104 affords the present invention significant advantages over gravimeters of the prior art. First, it mitigates or eliminates the influence of the Earth's magnetic field on the free-fall of test mass 104. As a result, the accuracy and sensitivity of a gravity measurement made with gravimeter 100 are improved.

Second, the lack of ferromagnetic materials enables the use of an electromagnetic launcher to propel test mass 104 into its free-fall position at apex 322. Inclusion of ferromagnetic materials in test mass 104 would make its free-fall sensitive to residual magnetic fields associated with the decay of electric current flow in propulsion coil 310. The use of an electromagnetic launcher also enables the generation of a force to slow test mass 104 as it nears the end of its downward travel, thereby enabling a soft landing and increasing the lifetime of test mass 104. Also, the use of an electromagnetic launcher obviates the need for complicated and expensive mechanical drop mechanisms, such as typically used in the prior art. Further, the lack of a mechanical drop mechanism enables gravimeter 100 to have a reduced form factor as compared to the prior art. As a result, gravimeter 100 can be used in applications that have commonly been unsuitable for prior art gravimeters.

Third, it is well-known that some material properties (in particular, magnetic permeability) of ferromagnetic materials are temperature sensitive. Gravimeter 100, therefore, is suitable for use over a much wider temperature range than gravimeters in the prior art.

Finally, known issues with hysteresis and hysteresis drift, vis-à-vis ferromagnetic materials, are mitigated or eliminated.

At operation 402, free-fall of test mass 104 along axis 106 from apex 322 is enabled. The free-fall of test mass 104 is enabled by launching it upward along axis 106 to apex 322, in response to a launch command provided by processor 112 on control line 114.

At operation 403, sensor 108 provides signal 110 to processor 112. Signal 110 is based on the motion of test mass 104 during its free-fall along axis 106.

At operation 404, processor 108 computes a value for gravity at the location of test mass 104.

In some embodiments, a plurality of gravimeters is used to provide a measurement of differential gravity between two locations. In some embodiments, a plurality of gravimeters is used to provide an average measurement of gravity at a single location.

Figure 4B:
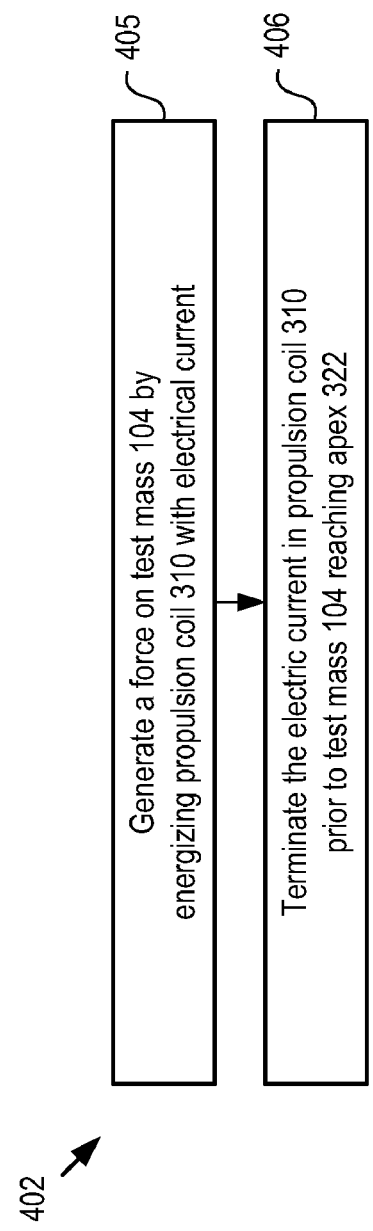
FIG. 4B depicts sub-operations suitable for performing operation 402.

FIG. 4B depicts sub-operations suitable for performing operation 402. FIG. 4B is described with continuing reference to FIGS. 1-3 and 4A. At operation 405, in response to a command from processor 112, power system 112 energizes propulsion coil 310 with electric current.

Due to inductive coupling between the coils, the flow of current in propulsion coil 310 induces an eddy current in mass coil 304. The flow of current in the two coils generates a propulsive force on test mass 104 that is directed upward along axis 106.

At operation 406, the current flow to propulsion coil 310 is terminated. As a result, the generated force is removed from test mass 104. The magnitude and duration of the current flow in propulsion coil 310 is such that the impulse of force on test mass 104 provides it with sufficient momentum to enable it to reach apex 322 and begin to free-fall back along axis 106. During its free-fall, test mass 104 accelerates due to the effects of local gravity.

Figure 5:
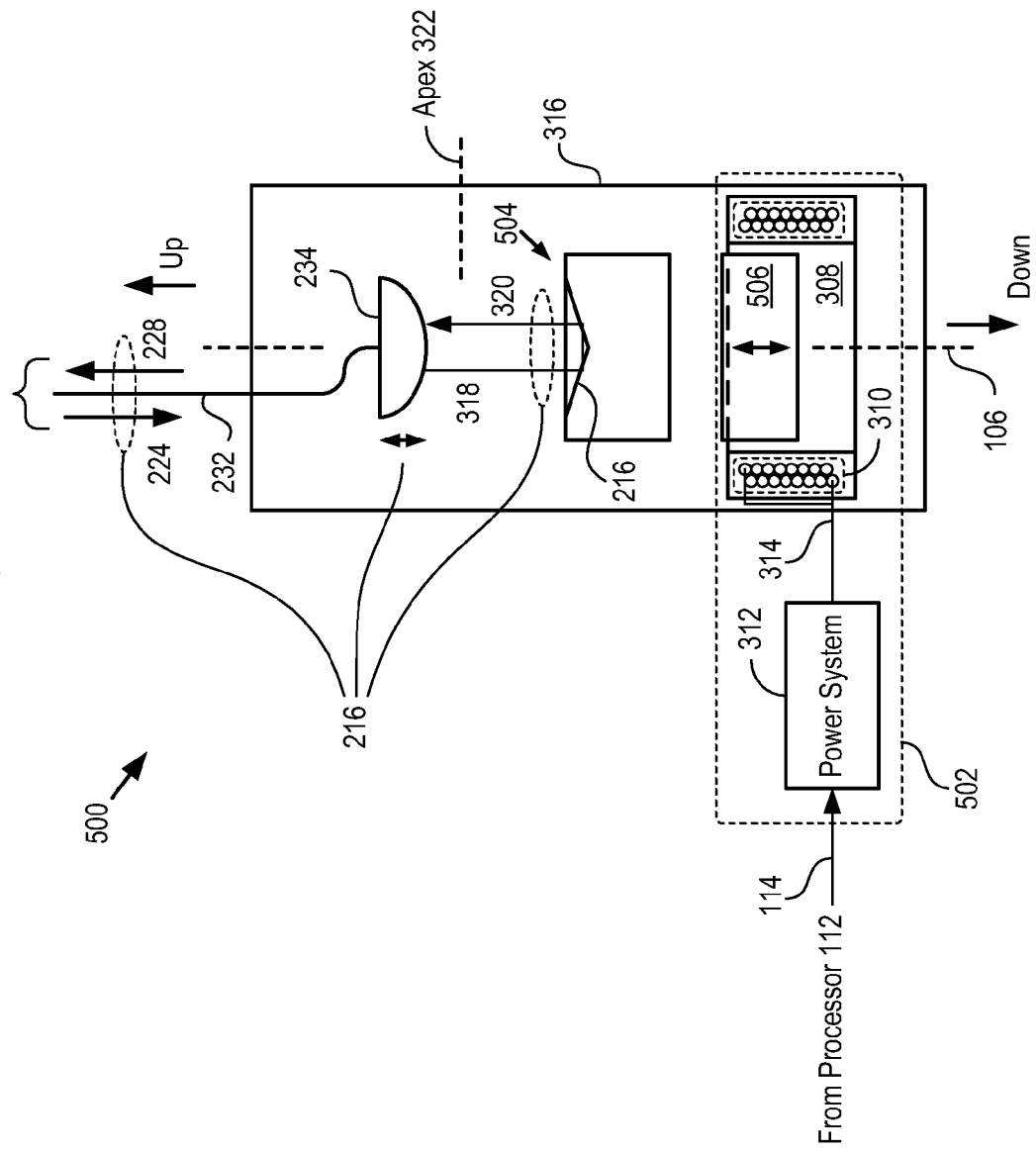
FIG. 5 depicts a schematic diagram of details of a test mass system in accordance with an alternative embodiment of the present invention.

FIG. 5 depicts a schematic diagram of details of a test mass system in accordance with an alternative embodiment of the present invention. Test mass system 500 comprises test mass 504, launcher 502, and housing 316.

Launcher 502 is an electromagnetic launch system; however, in contrast to launcher 306, launcher 502 throws test mass 504 by means of propelling an armature that is physically coupled, but not attached, to test mass 504.

Test mass 504 comprises only non-ferromagnetic materials. Materials suitable for use in test mass 504 include, without limitation, non-ferromagnetic metals and alloys, such as aluminum, copper, etc.; ceramics; polymers; glasses; composites; and the like.

Armature 506 comprises a ferromagnetic material to facilitate its coupling with the electromagnetic field generated by the flow of electric current in propulsion coil 310. Suitable materials for armature 506 include, without limitation, steel, iron, Permalloy, nickel and nickel alloys, cobalt and cobalt alloys, and the like.

Figure 6:
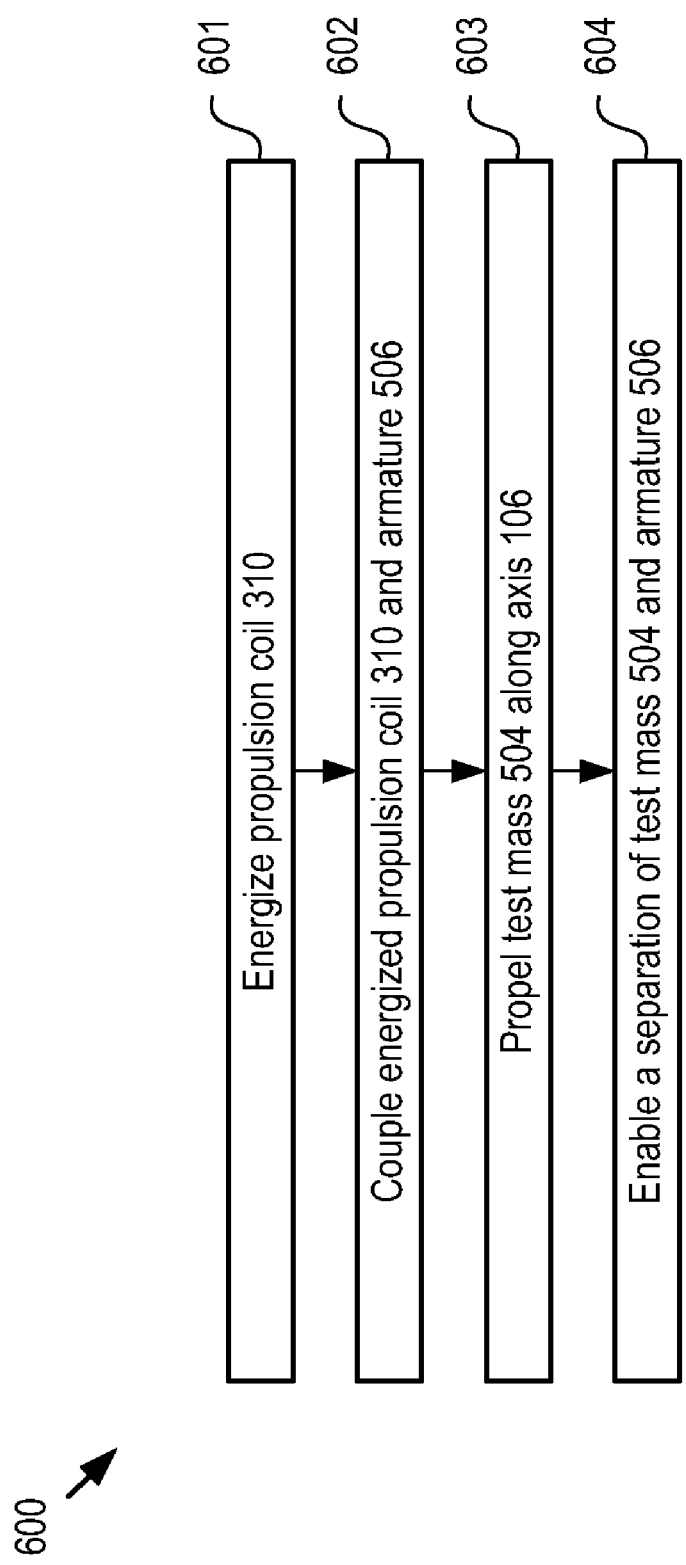
FIG. 6 depicts a method that comprises operations suitable for propelling a test mass to an apex in accordance with the alternative embodiment of the present invention.

FIG. 6 depicts a method that comprises operations suitable for propelling a test mass to an apex in accordance with the alternative embodiment of the present invention. FIG. 6 is described with continuing reference to FIG. 5. Method 600 begins with operation 601, wherein propulsion coil 310 is energized with a flow of electric current such that a magnetic field is generated upward along axis 106.

At operation 602, the magnetic field couples with armature 506. This induces motion of armature 506 upward along axis 106.

At operation 603, the upward motion of armature 506 propels test mass 504 upward along axis 106.

At operation 604, the flow of electric current to coil 310 is stopped and/or reversed to stop the motion of armature 506. By virtue of its attained momentum, test mass 504 separates from armature 506 and continues to the apex of its flight along axis 106 (i.e., apex 322). At apex 322, test mass 504 begins to free-fall downward along axis 106 in similar fashion to the free-fall of test mass 104. A value for the gravity at the location of test mass system 500 is then computed as described above and with respect to FIGS. 1-4A.

In some embodiments, armature 506 comprises a circular, electrically conductive element, such as mass coil 304. In such embodiments, energized propulsion coil 310 and armature 506 inductively couple such that an eddy current develops in the conductive element, which results in the propulsion of armature 504. In some embodiments, armature 506 comprises only non-ferromagnetic material.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
    a test mass, wherein the test mass is substantially ferromagnetic material-free;
    a housing, wherein the housing encloses the test mass in an environment that has a pressure of less than one atmosphere;
    a sensor, wherein the sensor provides a signal that is based on a free-fall of the test mass from an apex
    a launcher, wherein the launcher is an electromagnetic launcher that propels the test mass to the apex with an electromagnetic force; and a processor, wherein the processor receives the signal and computes a value for gravity based on the signal.

2. The apparatus of claim 1 wherein the launcher comprises:
    an armature that is concentric around an axis, wherein the armature is physically adapted to enable a first electric current to flow in the armature; and
    a coil that is concentric around the axis and whose inner diameter is greater than the outer diameter of the armature;
    wherein a second electric current that flows in the coil induces the first electric current, and wherein a force on the test mass is based on a mutual inductance of the armature and the coil.

3. The apparatus of claim 2 wherein the test mass comprises the armature.

4. The apparatus of claim 2 wherein the armature is physically adapted to throw the test mass toward the apex.

5. The apparatus of claim 1 wherein the launcher comprises:
    a loop, wherein the loop is electrically conductive and non-ferromagnetic, and wherein the loop is substantially immovable with respect to the test mass; and
    a coil, wherein the coil is substantially immovable with respect to the vacuum chamber;
    wherein a first electric current that flows in the coil induces a second electric current in the loop, and wherein the first electric current and the second electric current induce motion of the test mass.

6. An apparatus comprising:
    a test mass, wherein the test mass is substantially ferromagnetic material-free;
    a retro-reflector, wherein the retro-reflector and the test mass are physically coupled;
    a housing, wherein the housing comprises a vacuum chamber, and wherein the vacuum chamber encloses the test mass;
    a sensor, wherein the sensor provides an output signal that is based on the motion of the retro-reflector along an axis
    a launcher, wherein the launcher comprises an electromagnet, and wherein the electromagnet is physically adapted to propel the test mass along the axis to an apex; and a processor, wherein the processor receives the output signal and computes a value for gravity based on the signal.

7. The apparatus of claim 6, wherein the sensor comprises an interferometer having a sample arm, and wherein the length of the sample arm is based on the position of the retro-reflector along the axis.

8. The apparatus of claim 6 wherein the launcher comprises:
   a first coil, wherein the first coil is substantially immovable with respect to the housing; and
   an armature;
   wherein a first electric current that flows in the first coil generates a magnetic field, and wherein the magnetic field induces motion of the armature along the axis, and further wherein a first motion of the armature along the axis induces a second motion of the test mass along the axis.

9. The apparatus of claim 8 wherein the armature is substantially ferromagnetic material-free, and wherein the armature is substantially immovable with respect to the test mass.

10. The apparatus of claim 8 wherein the armature comprises a ferromagnetic material, and wherein the first motion of the armature throws the test mass to the apex.

11. The apparatus of claim 8 wherein the armature comprises a circular conductor, and wherein the first electric current induces a second electric current in the circular conductor, and wherein the first electric current and the second electric current mutually induce a force on the armature.

12. The apparatus of claim 8 wherein the armature comprises a second coil:
   wherein the second coil is concentric around the axis;
   wherein the first coil is concentric around the axis and has an inner diameter that is greater than the outer diameter of the second coil; and
   wherein the first electric current induces the flow of a second electric current in the second coil, and wherein a force on the test mass is based on a mutual inductance of the first coil and the second coil.

13. A gravity measurement method comprising:
   providing a test mass that is substantially ferromagnetic material-free;
   propelling the test mass along the axis to an apex, wherein the test mass is propelled by means of a force impulse, and wherein the force impulse is generated electromagnetically;
   generating a first signal, wherein the first signal is based on the motion of the test mass along the axis; and
   computing a value for gravity based on the first signal.

14. The method of claim 13 wherein the test mass is propelled by an electromagnetic launcher.

15. The method of claim 13 further comprising generating the force impulse by operations comprising:
   energizing a first coil with a first pulse of electric current, wherein the first pulse generates a first magnetic field; and
   generating a force impulse that induces a motion of the test mass along the axis.

16. The method of claim 13 further comprising generating the force impulse by operations comprising:
   energizing the first coil with an electric current, wherein the energized first coil and a second coil are inductively coupled, and wherein the test mass comprises the second coil; and
   terminating the flow of electric current in the first coil prior to the test mass reaching the apex;
   wherein the inductive coupling of the first coil and the second coil produces a force on the second coil, and wherein the force is directed along the axis.

17. The method of claim 13 wherein the force impulse is generated by operations comprising:
   energizing a first coil with a first pulse of electric current; and
   coupling the energized first coil and an armature;
   wherein the force impulse propels the armature along the axis, and wherein the armature propels the test mass.

18. The method of claim 17 further comprising enabling a separation of the test mass and the armature before the test mass reaches the apex.

19. The method of claim 13 wherein the force impulse is generated by operations comprising:
   energizing a first coil with a first pulse of electric current, wherein the energized first coil develops a magnetic field that is directed along the axis; and
   coupling the magnetic field and an armature, wherein the armature comprises a ferromagnetic material.

20. The method of claim 19 further comprising enabling a separation of the test mass and the armature before the test mass reaches the apex.

* * * * *